June 6, 1972 B. ZOPPI 3,667,815
SERVO DISTRIBUTORS IN PNEUMATIC BRAKING SYSTEMS
OF VEHICLES WITH TRAILER
Filed Oct. 23, 1969

INVENTOR.
BRUNO ZOPPI

BY
Ostrolenk, Faber, Gerb & Soffen
ATTORNEYS

United States Patent Office 3,667,815
Patented June 6, 1972

3,667,815
SERVO DISTRIBUTORS IN PNEUMATIC BRAKING SYSTEMS OF VEHICLES WITH TRAILER
Bruno Zoppi, Milan, Italy, assignor to Fabbrica Italiana Magneti Marelli S.p.A., Milan, Italy
Filed Oct. 23, 1969, Ser. No. 868,861
Claims priority, application Italy, May 2, 1969, 16,306/69
Int. Cl. B60t *13/28*
U.S. Cl. 303—7
4 Claims

ABSTRACT OF THE DISCLOSURE

Servo distributor apparatus for rapidly increasing pneumatic pressure applied to the braking system of a towed vehicle upon initial phase of actuation of the brake pedal of the towing vehicle and for controllably increasing the pressure thereafter so that braking of the towed vehicle will occur either before or simultaneously with the braking of the towing vehicle.

---

In the brake systems of industrial vehicles intended for the towing of trailers or semi-trailers in which the distributor which is actuated by the brake pedal is of the double-section type used for the braking of the automotive vehicle, recourse is had for the braking of the towed vehicle to an apparatus known under the names of servo distributor, repeating valve or relay valve.

The servo distributor receives the control pressure from one or both of the moderatable conduits which connect the distributor to the elements which operate the brakes of the tractor vehicle, depending on whether there is concerned a servo distributor of simple or double control, the latter solution offering greater reliability of operation of the brake system.

When the control pressure reaches the servo distributor, the latter takes compressed air from the corresponding tank, also connected to it, and sends it to the moderatable conduit connected via the coupling joint to the servo automatic distributor, which in its turn takes compressed air from the tank (or tanks) of said last-mentioned vehicle to send it to the corresponding brake operating elements.

The servo distributor and the servo automatic distributor in question have an insensitivity of control due to the opening load of the respective valves, the load of the return springs (if any) of the pistons present therein and the wear which develops between the parts which are in relative movement.

Therefore, a certain control pressure is necessary in order to start the delivery of compressed air by the said apparatus.

The insensitivity of the two apparatus adds onto each other, and it may, therefore, happen that when effecting only slight braking, for instance, in order to obtain a simple deceleration of the vehicle, or in case of travel over slippery ground, the braking of the tractor vehicle is already in action while the towed vehicle still remains unbraked.

In such case, the towed vehicle exerts a push on the tractor vehicle, creating a condition unfavorable for the stability of the composite vehicle, while there would be advisable the opposite condition of a slight lead in the braking of the towed vehicle, or at least simultaneity of the braking actions of the tractor vehicle and the towed vehicle.

There are known pneumatic systems for the braking of automotive vehicles adapted for the towing of trailers and semi-trailers in which, in order to obviate the drawback which has just been indicated, retarding valves are inserted in the moderatable conduits connecting the distributor with the brake operating elements. This expedient, however, has the disadvantage of resulting in an increase of the braking space when it does not directly cause an impermissible increase in the build-up times of the pressure in the brake operating elements.

The purpose of the present invention is to avoid these drawbacks.

In accordance with the invention, the servo distributor is provided with devices which are adapted to obtain during the initial phase of actuation of the brake pedal the delivery of compressed air with a very rapid increase of the pressure up to a predetermined value, upon the reaching of which the pressure of the air delivered will follow the desired law of proportionality between control pressure and response pressure, until reaching the predetermined maximum pressure (self-limiting pressure).

The response pressure of the servo distributor which is reached during the initial phase of actuation of the brake pedal can be established in such a manner as to obtain simultaneity in the braking of the tractor vehicle and of the towed vehicle, or a slight lead in the braking of the latter as compared with the braking of the tractor vehicle.

As a matter of fact, after the control pressure corresponding to the insensitivity of the servo distributor has been reached (which pressure in general is just sufficient by itself for the operating elements of the brakes of the tractor vehicle to produce a thrust such as to overcome the actions of the return springs of the members of the said operating elements and of the brake shoes, and, therefore, insufficient to produce a true braking action), there can be obtained a very rapid increase in the response pressure of the servo distributor such as to overcome not only the insensitivity of the servo atuomatic distributor of the vehicle towed, but to obtain even, if desired, a slight lead of the braking of the towed vehicle with respect to the braking of the tractor vehicle.

For this purpose, it is sufficient to proportion the amplitude of the rapid front increase in the initial response pressure of the servo distributor.

The present invention is illustrated by way of example in a preferred embodiment in the figures in which.

Figure 1:
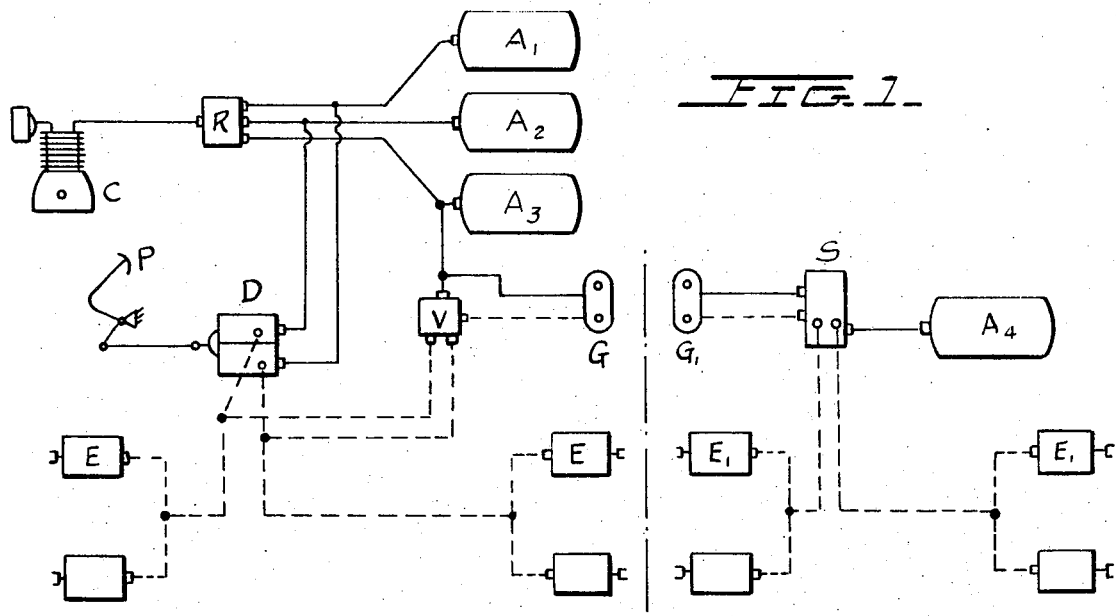
FIG. 1 shows schematically a pneumatic brake system for the braking of a tractor and trailer provided with the servo distributor in accordance with the invention.

In FIG. 1, in which the solid lines indicate the automatic conduits and the dashed lines the moderatable conduits, the compressor C, via the regulator R, feeds the tanks $A_1$–$A_2$–$A_3$, the first two of which are connected to the distributor D controlled by the brake pedal P, while the other is connected to the servo distributor V, which is the object of the present invention, and to the coupling half-joint G.

The servo distributor V is also connected to the moderatable conduits which connect the distributor D to the operating elements E of the brakes of the tractor vehicle and to the coupling joint G.

The servo automatic distributor S of the towed vehicle is connected to the half joint $G_1$, to the tank $A_4$ and to the operating elements $E_1$ of the towed vehicle.

When the distributor D is actuated by means of the pedal P, it takes compressed air from the tanks $A_1$ and $A_2$, sending it to the operating elements E and to the servo distributor V, which is the object of the present invention.

The servo distributor V, when subjected to the action of the pressure coming from the distributor D, takes compressed air from the tank $A_3$ and sends it to the servo automatic distributor S via the coupling joint G–$G_1$.

The servo automatic distributor S in its turn takes compressed air from the tank $A_4$ and passes it to the operating elements $E_1$ of the towed vehicle.

Figure 2:
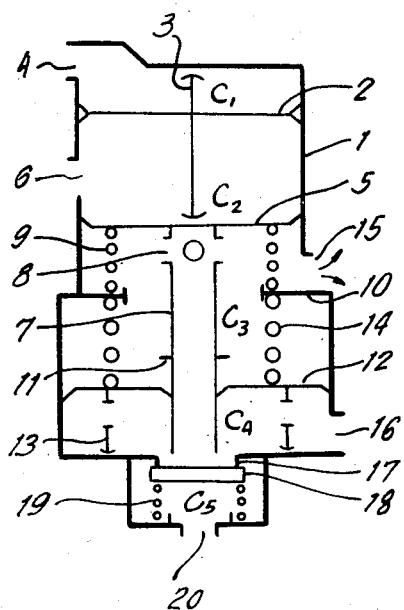
FIG. 2 shows schematically a cross-section through the servo distributor.

Referring to FIG. 2, which shows schematically the servo distributor which is the object of the present invention, 1 is the body of the apparatus which has a cylindrical cavity in which three pistons are mounted. The piston 2, provided with push rod 3, defines the chamber $C_1$ connected by the connection 4 with the moderatable conduit of one of the two brake sections of the tractor vehicle. The piston 5, together with the piston 2, defines the chamber $C_2$ which is connected by the connection 6 with the moderatable conduit of the other brake section of the tractor vehicle. The piston 5 is provided with a push rod 7 bored longitudinally and provided with radial holes 8 and is subjected to the action of the return spring 9 which rests against the annular abutment 10 provided in the body 1.

The spring 9 urges the pistons 2 and 5 towards the upper end of the body 1.

On the push rod 7 there is also provided a collar 11.

A third piston 12 is mounted in the lower part of the body 1, having a cylindrical cavity of a diameter greater than that which houses the pistons 2 and 5.

The piston 12 has a central hole through which there tightly passes the bored push rod 7 of the piston 5 and it is provided with stops 13 which rest on the lower end of the body 1, against which the piston 12 is pushed by the spring 14 interposed between the piston 12 and the annular stop 10 of the body 1.

The piston 12, together with the piston 5, defines the chamber $C_3$ communicating with the atmosphere through the port 15 and, together with the lower end of the body 1, it defines the chamber $C_4$ which is connected by the connection 16 with the moderatable conduit extending to the coupling half joint (G of FIG. 1). The lower end of the body 1 bears the seat 17 for the inlet and discharge valves 18, the latter held against its seat by the spring 19.

The chamber $C_5$ below the valve 18 is connected by the connection 20 with the corresponding tank ($A_3$ of FIG. 1).

When the apparatus is at rest, the chambers $C_3$ and $C_4$ are connected to each other and to the atmosphere via the longitudinal bore and the radial holes 8 of the push rod 7 and the port 15.

The operation of the apparatus is as follows:

During the initial phase of actuation of the brake pedal, the compressed air arrives into the chambers $C_1$ and $C_2$.

The piston 2, in pneumatic equilibrium between the equal pressures acting on its two faces, remains at rest, while the piston 5 is displaced downward in the figure.

In case of damage in the braking section of the tractor vehicle connected to the chamber $C_1$, the compressed air reaches only into chamber $C_2$; in case of damage in the section connected to the chamber $C_2$, the compressed air reaches only into chamber $C_1$, the piston 2 is pushed downward in the figure and its push rod 3 in its turn pushes the piston 5 downward.

The operation of the apparatus is, therefore, assured even in case of damage in one of the brake sections of the tractor vehicle.

The displacement of the piston 5 and of its bored push rod 7 causes first of all, when the rod 7 approaches the valve 18, the closing of the communication between the chamber $C_4$ and the chamber $C_3$, and, therefore, between the chamber $C_4$ and the atmosphere; thereupon it effects the opening of the valve 18 which places the chambers $C_4$ and $C_5$ in communication, permitting the passage of compressed air from the connection 20 to the chamber $C_4$ and, via the connection 16, to the moderatable conduit connected to the servo automatic distributor of the towed vehicle via the coupling joint (G–$G_1$ of FIG. 1).

When the pressure in the chamber $C_4$ reaches a predetermined value, the piston 12, the said pressure acting on its lower face, overcomes the action of the spring 14, which is suitably calibrated, and moves upward in the figure until encountering the collar 11 provided on the rod 7 of the piston 5.

Therefore, during this initial phase of actuation of the brake pedal, there is a rapid increase in the pressure of the air in the chamber $C_4$, independent of the control pressure reached in the chambers $C_1$ and $C_2$, or in one of them in case of damage to one of the two brake sections of the tractor vehicle, but depending solely on the load of the spring 14 at the time of contact between the piston 12 and the collar 11 of the rod 7 of the piston 5.

When contact is made, the two pistons 5 and 12 are connected together, forming a single assembly; there thus terminates the initial phase of actuation of the brake pedal.

During the next phase, the pressure of the air in the chamber $C_4$ and in the moderatable conduit connected to it increases proportional to the increase in pressure in the chambers $C_1$ and $C_2$, or in one of them in case of damage to one of the brake sections of the tractor vehicle, until reaching—if the brake pedal is depressed all the way—the maximum predetermined pressure (self-limiting pressure).

The larger size of the piston 12 as compared with the pistons 2 and 5 is because of the fact that the spring 14 continues to act on the piston 12 even after the initial phase of actuation of the brake pedal, and, therefore, its action must be counterbalanced by an equivalent pneumatic thrust below the piston 12, in addition to the pneumatic thrust which counterbalances the thrust of the pressure acting on the pistons 2 and 5 (or on one of them).

Figure 3:
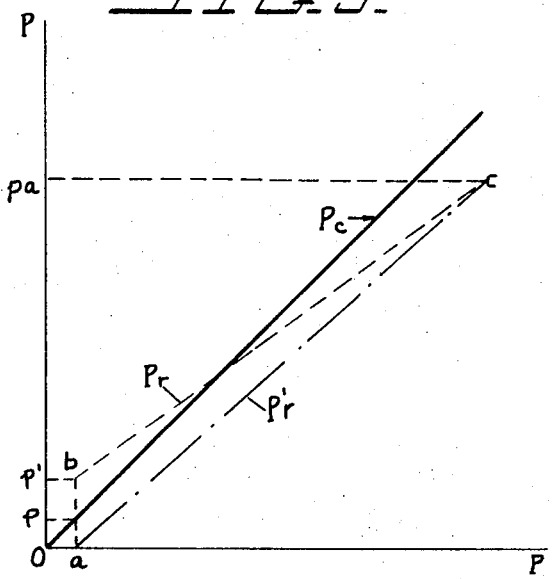
FIG. 3 is an operating diagram of the said apparatus.

The operation of the apparatus is also illustrated by the diagram of FIG. 3.

The control pressure represented by the line $P_c$ reaches a given value $p$ corresponding to the insensitivity of the apparatus when the delivery of the air starts (point $a$ on the abscissa axis).

The response pressure, as from this time, shows a rapid increase up to the point $b$ corresponding to the pressure $p'$ which is predetermined by suitable proportioning of the spring 14 at the time of the engagement of the piston 12 with the collar 11 provided on the rod 7 of the piston 5.

Therefore, the response pressure represented by the dashed line $P_r$ increases with a law proportional to the control pressure $P_c$ up to the point $c$ corresponding to the self-limiting pressure $P_a$.

The dot-dash line $P'_r$ represents the law of increase of the pressure in an apparatus not provided with the devices in accordance with the invention; there is obvious from a comparison of the lines $P_r$ and $P'_r$ as a function of the line $P_c$ the advantage which is obtained with an apparatus in accordance with the present invention which, by utilizing the rapid increase in pressure in the initial phase of actuation of the brake pedal up to a value which exceeds or is at least equal to the total insensitivity of the servo distributor and of the servo automatic distributor (S of FIG. 1), makes it possible to send air to the operating elements of the brakes of the towed vehicle in such a manner that the action of the latter commences at the same time as or even before the commencement of the braking action of the tractor vehicle.

The solution described and illustrated above has been given merely by way of illustration; other solutions may be realized within the scope of the present invention.

What is claimed is:

1. A pneumatic brake control system for semi-trailer and tractor trailer combinations having first and second brakes; said system including a source of compressed air, servo distributor apparatus, brake pedal actuable means to place said source in communication with said first brakes and a chamber of said apparatus; said chamber being defined partially by a piston and communicating with a conduit connected to the second brakes; said apparatus also including piston means partially defining chamber means connectable to said source through said brake pedal actuable means; a normally closed valve through which said chamber is connectable to said source by means by-passing said brake pedal actuable means; said piston means and said piston being operatively connected for movement relative to each other whereby during operation in its initial phase of said brake pedal actuated means pressure from said source passing through said brake pedal actuated means moves said piston means against the bias of a biasing means to operatively engage and thereby open said valve means to admit pressure of said source into said chamber causing rapid pressure buildup in said chamber independent of pressure in said chamber means, and during operation in its next phase of said brake pedal actuated means pressure in said chamber causes movement of said piston which operatively engages said piston means thereby moving the latter in a direction away from engagement with said valve; said servo distributor apparatus further including a spring means urging said piston in a first direction to reduce the volume of said chamber, during operation in said initial phase said piston being free of pressure influences in said chamber means and during operation in said next phase pressure influences in said chamber means acting through said piston means urge said piston in said first direction.

2. A brake control system as set forth in claim 1, in which the spring means is preloaded to a predetermined level as a function of the maximum pressure desired in said chamber at the end of operation in said initial phase.

3. A brake control system as set forth in claim 1, in which the chamber means comprises first and second chambers connected in series and fed independently from said source whereby said piston means is actuable by pressure in either said first or second chambers.

4. A brake control system as set forth in claim 1 in which there is a longitudinal movable rod to which a portion of said piston means is mounted for movement therewith, said piston being slidably mounted to said rod for movement therealong relative to said portion of said piston means, and means mounted on said rod to limit movement of said piston toward said portion of said piston means.

References Cited
UNITED STATES PATENTS

| | | | |
|---|---|---|---|
| 3,272,564 | 9/1966 | Romanini | 303—13 X |
| 3,275,381 | 9/1966 | Pfeifer | 303—7 |
| 3,279,867 | 10/1966 | Bueler | 303—40 X |
| 3,361,485 | 1/1968 | Romanini | 303—7 X |
| 3,504,946 | 4/1970 | Valentine et al. | 303—13 X |

MILTON BUCHLER, Primary Examiner

J. J. McLAUGHLIN, Assistant Examiner

U.S. Cl. X.R.

188—3 R; 303—2, 13, 40